Sept. 7, 1943.   W. C. EDDY   2,329,112
PROJECTION KALEIDOSCOPE
Filed May 15, 1941
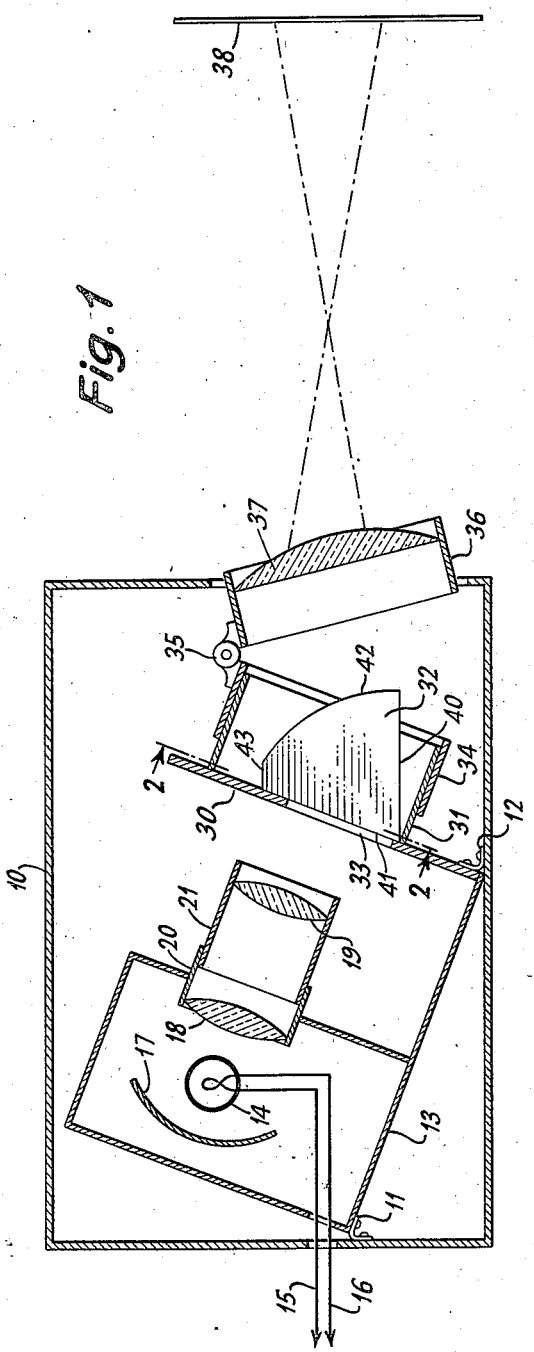
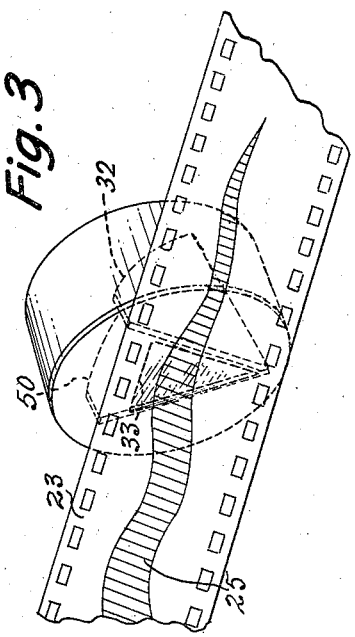
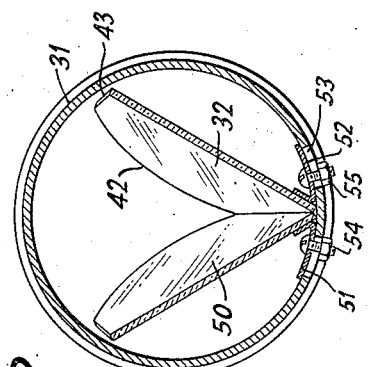
INVENTOR.
WILLIAM C. EDDY
BY
ATTORNEY.

Patented Sept. 7, 1943

2,329,112

UNITED STATES PATENT OFFICE 2,329,112

PROJECTION KALEIDOSCOPE

William C. Eddy, Chicago, Ill., assignor to Radio Corporation of America, a corporation of Delaware Application May 15, 1941, Serial No. 393,516

2 Claims. (Cl. 88—24)

My invention relates, in general, to optical projection apparatus, and more particularly to projection kaleidoscopes.

Projection kaleidoscopes have been disclosed heretofore but the devices themselves have, in general, proved to be unsatisfactory. One of the difficulties attending the design of such kaleidoscopes has been the inability of the device to produce a full kaleidoscopic pattern on an objective plane. Accordingly, one of the objects of my invention is to provide a projection kaleidoscope in which the image formed on the objective plane comprises a full or 360° kaleidoscopic image.

A kaleidoscopic image is, of necessity, formed of various segments. In the devices which have been described in prior disclosures several problems regarding light distribution have been present, and which are inherent to the types of devices previously described and disclosed. In the first place, it will be noted that one of the effects that stands out clearly is the unequal light distribution between the different segments forming the kaleidoscopic pattern. The segments, being formed by reflection and re-reflection of the original image from which is produced the pattern, it is obvious that there must be light losses in the transmission of the image to and from the reflecting members during the reflection and re-reflection thereof. Naturally, the segment which is formed by the least number of reflections and re-reflections of the original image will be the broadest segment of the formed pattern. The brilliance of the other segments then falls off until, in many instances, the segment formed by the greatest number of reflections and re-reflections is quite dark compared to the initially discussed segment due to the depreciation by segments of the light. Naturally, it detracts from the pleasing effect to an observer if one segment of the pattern is light in shade and another segment, which should be substantially the same in optical values, is much darker in shade. Another of the drawbacks inherent in the previously described projection kaleidoscopic devices has been that even within the same segment the background light value is not substantially constant and thus the pleasing effect on an observer is largely mutilated. It forms an important object, therefore, in my invention to provide a projection kaleidoscope apparatus in which the light balance in the various segments of the formed kaleidoscopic pattern will be very good and in reasonable focus, and thus will enhance the pleasure derived from watching the formation of such patterns.

The adaptation of color in the formation of kaleidoscopic patterns has been made possible by the use of film on which various characters are recorded, as disclosed in my Patent No. 2,307,202, issued on January 5, 1943. It is believed that it is now a well recognized fact that pleasing combinations of colors are known to have a beneficial psychological effect on sensory reaction or perception within an observer. Again, since a kaleidoscope produces an image whose arrangement is automatically in perfect composition the formation of geometric figures, particularly in a pattern which is perfectly composed, also is pleasing psychologically. It is another of the objects of my invention, therefore, to provide a projection kaleidoscope apparatus in which the formed pattern of itself not only is pleasing and stimulates desirable psychological reactions, but also pleasing combinations of colors may be utilized in conjunction therewith and enhance the effect thereof.

Apparatus of the kind hereinafter to be described is very well adapted for use in such fields as the advertising field wherein so-called dynamic or moving effects are utilized not only to attract attention, but also to please the observer. Naturally, for use in such purposes as shop windows the apparatus should be as compact as possible. For uses such as this it is necessary to provide a projection kaleidoscope unit which is capable of producing a large picture at a short range. Accordingly, it is another of the objects of my invention to provide projection kaleidoscope apparatus which will form a well balanced kaleidoscopic pattern of good size at a comparatively short range.

In addition to carrying out the objects hereinbefore stated, it is also desirable that such an apparatus as will be disclosed hereinafter should be such that an operator may be able to change the size of the projected pattern easily without changing the focus or the distance of the unit from the plane of projection, the latter in most instances being a planar screen arrangement, and accordingly it is another of the objects of my invention to provide a projection kaleidoscope apparatus which will enable an operator to change the size of the kaleidoscopic pattern formed on a plane of projection without changing the focus of the pattern, or the distance of the kaleidoscope unit from the plane of projection.

Accordingly, among the objects of my invention are:

1. To provide a projection kaleidoscope in which the image formed on the objective plane comprises a full or 360° kaleidoscopic image.
2. To provide a projection kaleidoscope in which the light balance within each segment and between the segments of the formed pattern will be very good.
3. To provide a projection kaleidoscope in which patterns of pleasing color combinations may be formed.
4. To provide a projection kaleidoscope apparatus which will form a well balanced kaleidoscopic pattern of good size at a comparatively short range.
5. To provide a projection kaleidoscope apparatus which will enable an operator to change the size of the kaleidoscopic pattern formed on a plane of projection without changing the focus of the pattern, or the distance of the kaleidoscope from the plane of projection.

My invention, in general, comprises providing a light projection system which is associated with members for reflecting and re-reflecting optical images impressed thereon, the optical images in this particular case being furnished by special recordings on a film. In contradistinction to the general type of kaleidoscope as illustrated, for instance, in my above mentioned Patent No. 2,307,202 and in which the direction of the beam of light projected through the film and onto the reflecting and re-reflecting members is parallel to the axis of the reflectors, in my invention the axis of the light beam is such that it forms an angle with the longitudinal axis of the reflecting and re-reflecting members. Also, in contradistinction to the previously known apparatus, in which the kaleidoscopic image formed was focused onto an objective plane by means of a lens whose axis was parallel to the longitudinal axis of the reflecting and re-reflecting members, in my invention the lens which focuses the formed kaleidoscopic image onto the objective plane must have its axis positioned at an angle with respect to the reflecting and re-reflecting members commonly known in kaleidoscopic apparatus. Also, in contradistinction to the previously known apparatus in which the reflectors usually comprised two or three rectangularly shaped mirrors having the edges of at least two mirrors thereof joined together, the present apparatus uses, but is not limited to the use of, two reflecting members having a special form and having one edge of each joined to the other. The arrangement as hereinafter described in particular will, in carrying out this general pattern, be shown to provide an arrangement in which a well formed 360° kaleidoscopic pattern is formed having a very good light balance in each individual segment thereof, and also between all of the segments.

It will be appreciated that by recording in color the portions of the optical image from which is to be formed a kaleidoscopic pattern, the pattern so formed on the objective plane or screen may be made up of any desired color or any combinations thereof and this effect has been found to be very pleasing.

My invention will best be understood by reference to the drawing, in which:

Fig. 1 shows one embodiment of my invention.

Fig. 2 shows a portion of the arrangement according to Fig. 1 as seen on a cutting plane passing through the line 2—2, and at right angles to the plane of the paper.

Fig. 3 shows an apertured masking member.

Referring to Fig. 1, there is shown one embodiment of my invention. In this figure the complete apparatus is housed in a substantially light type housing 10. It will be appreciated, however, that this is for convenience and not necessity. Fastened to the housing 10 by members 11 and 12 is a lamp housing 13 containing a lamp 14 having energizing leads 15 and 16. For purposes of simplicity the source of energy is not shown. Positioned behind the lamp 14 is a reflecting member 17. Accordingly, when the lamp is lighted a beam of light will be passed through lenses 18 and 19, the former being shown as mounted in a lens housing 20, and the latter being shown as mounted in a lens housing 21, the lens housing 21 being adjustable with respect to the lens housing 20. Positioned in the path of the beam of light is a masking arrangment 30 which has connected thereto a member 31 capable of being moved in relation to the center line of the light source for housing the reflecting and re-reflecting members, one of which is shown at 32. While the masking member 30 has the opening 33 therein positioned substantially normally to the path of the beam of light projected through lenses 18 and 19, it will be noted that the reflecting and re-reflecting members, one of which is illustrated as 32, are positioned with the longitudinal axis thereof at an angle with respect to the path of the beam of light passing through the lens 19.

In general, the aperture 33 comprises a small triangularly shaped aperture, and in this figure the light from the lens 19 is focused about one fourth of the way down the aperture, which results in a vertical unbalancing of the lighting passing through the entire aperture.

Positioned concentrically with respect to the member 31 is an apertured member 34 which rests on the outer surface of the member 31, and which is adjustable with respect thereto, that is to say, may be slid either inwardly or outwardly. Connected to the member 34 is a hinge member 35, one side of which connects to the member 34, and other side of which holds a lens housing 36, the housing containing lens 37 which projects the kaleidoscopic image onto an objective plane 38. It will be noted, therefore, that several adjustments of the lens 37 with respect to the reflecting and re-reflecting members is possible. The lens either may be brought closer to the reflectors or positioned further away therefrom by movement of the member 34. Similarly, not only may the lens 37 be brought closer with respect to the reflecting and re-reflecting members, or moved further away therefrom due to its hinged relationship with respect to the reflecting members, the latter being usually fixed in position, but also the relative angle which the axis of the lens forms with the longitudinal axis of the reflecting and re-reflecting members may be determined thereby.

It will be noted that in contradistinction to the usual kaleidoscopic arrangements in which the mirrors or reflectors are rectangular in shape, the shape of the presently contained reflectors may deviate considerably from that of the prior art. In the present case the mirror illustrated at 32 has a linear bottom edge 40, and the left hand edge which is linear in this illustration forms an acute angle with the bottom edge as illustrated at 41. The right hand edge 42 thereof is non-linear or contradistinct from the usual arrangements of the prior art, and in this showing is arcuate, while the upper edge 43 is linear and is substantially parallel with the lower edge 40. It will be appreciated that this is a considerable deviation from the usual rectangularly shaped mirrors normally known in kaleidoscopic apparatus.

Also, while in the specification the reflectors have been referred to hereinbefore as mirrors, nevertheless it will be appreciated that equivalent devices can be used. For instance, the reflecting system could be made up in the form of a prism having at least two outer faces thereof coated so that these faces would comprise totally reflecting surfaces. This would have the advantage of minimizing the necessity for relative adjustment between the reflectors, which then would be fixed, and also of substantially obviating the effects of extraneous undesired material such as dust. For purposes of simplicity such a prism has not been illustrated, but it is purely within the ability of a person skilled in the art to which this invention belongs to construct such a prism, particularly in view of the showing in Fig. 2, which illustrates what may be the angular deviation between the faces of the prism and the showing in Fig. 1, in which the general shape of one of the outer faces of the prism longitudinally is illustrated as it necessarily would be made.

Referring to Fig. 2, there is shown the general arrangement of the reflectors 32 and 50 and the housing 31 as seen on a cutting plane at right angles to the plane of the paper and passing through the line 2—2, and there is also shown the means for adjusting the relative angle of the reflectors. This also gives an indication of the relative angle at which the light beam passing through the lens 19 and through the film 23 containing the images 25 to be formed into kaleidoscopic patterns (the latter being shown in Figure 3 only for purposes of simplicity) will impinge onto the face of the reflectors 32 and 50. The apparatus for holding the film 23 in place and actually guiding the film past the aperture 33 of the masking means 30 is not per se a part of this invention, and since it is not claimed specifically herein, it has not been illustrated; but reference may be made to my above mentioned Patent No. 2,307,202, and particularly the showing in Figs. 3 and 6 thereof for the preferred embodiment of a device for passing the film containing recorded material, and on which kaleidoscopic patterns are to be formed, past the aperture 33 for the purpose of projecting these images onto the reflecting and re-reflecting members in order to form said kaleidoscopic patterns. It will be understood, however, that that embodiment, with its associated apparatus, is fully adaptable for use in the structure according to this invention.

There is also shown in Figure 2 an arrangement for holding the reflecting surfaces in position and also for allowing changing of the angular relationship of each with respect to the other. For purposes of simplicity this showing has been omitted from Fig. 1 and Fig. 3. In general, the arrangement comprises a pair of bent strap members 51 and 52, each of which is positioned on the outside of one of the reflecting surfaces. An elongated slot 53 is cut in the casing on either side of the reflectors and a bolt and nut arrangement 54 and 55 passes through the slot in the casing and engages one of the holding straps. By moving the bolt and nut arrangement along in the elongated slot the position of the holding straps may be changed relatively to the reflectors, and since the strap may either be joined to the reflector in an appropriate fashion or else the reflector will rest against the strap, it will be appreciated that there will result a change in the angular relationship of the two reflecting members 32 and 50. It will be appreciated that other equivalents may be used which will fall fairly within the spirit and scope of this showing.

Referring to Fig. 3, there is shown the general arrangement of the aperture 33 with respect to the mirrors, and it will be appreciated that this illustrates one way in which light may be admitted into the chamber containing the reflecting and rereflecting means, and that there may be departures from this particular showing without departing from the spirit and scope of my invention. The masking means 30 is shown with the aperture 33 therein and the relative position of the reflectors 32 and 50 with respect thereto. Light from the lens 19 is focused about one fourth of the way down the aperture which results in vertically unbalancing the lighting of the entire aperture.

There has been alluded to in my above mentioned Patent No. 2,307,202, the fact that a sound score may be utilized in conjunction with the kaleidoscopic pattern formation. This arrangement is fully usable with the present application, and together with the possibility of forming a kaleidoscopic pattern in colors, gives a definite pleasing effect. It will be appreciated that the source of light shown in Fig. 1 and identified as 14 may be made adjustable in any axis with respect to the reflecting members, one of which is shown at 32, or the reflecting members may be made adjustable, that is to say, movable in any desired axis with respect to the source of light and to the masking means containing the aperture 33.

I believe the operation of my device to be as follows. In the kaleidoscopes known to the prior art the optical paths taken by the image forming one of the segments of the finally produced kaleidoscopic image varied widely from that taken by another of the images forming a segment of the finally formed kaleidoscopic pattern. This would mean, then, that there would result a light diminution due to the difference in optical paths traveled, with the resultant loss of light. By projecting the images onto the reflecting members by a light beam forming an angle with respect to the longitudinal axis of the reflectors, the intensity of the original image falling on different portions of the reflectors was substantially different in intensity. Also, by the special shape of the reflectors the total number of reflections of any image forming one of the segments of the kaleidoscopic pattern is controlled so that the total number of reflections and re-reflections thereof may be governed. Now, in addition, the distance of the lens 37 from the reflecting means plays an important part, and also the angle with which this lens is positioned with respect to the longitudinal axis of the reflecting members plays an important part. Now, by controlling and properly adjusting these variables it is possible to control the total optical path of any image which forms a segment of the kaleidoscopic pattern, and hence by so doing the total light which results in the finally formed pattern, and which is a function of the light intensity of the image as it first strikes the reflector, the number of times it is reflected and re-reflected (the latter governing the air path within the housing containing the reflectors), the distance of the image from its final reflection on the reflectors to the lens 37, the thickness of the lens at various portions thereof, and the distance from the portion of the lens through which the image segment finally emerges to the plane of observation. It will be appreciated that the proper control of one of these variables may compensate for incorrect adjustment of some of the other variables. In general, then, I believe it may be said that the final result comes from properly controlling original optical intensities as the image strikes the reflectors, and the total optical path taken by the image until it impinges on the plane of observation as a segment in the kaleiodscopic pattern.

Therefore, it may be said that we have three distinct variables in so far as optical paths are concerned. One is the angular relationship of the surface-faced mirrors with respect to the projection apparatus 18, 19. The other is the angular adjustment of the lens 37 with respect to the mirrors 32, 50. The other is the adjustment of the focal screen with respect to the lens 37. This, of course, does not include the relative adjustment of the surfaced-faced mirrors each with respect to the other, whereby the angular distance between the mirrors may be varied. This, of course, controls the movement of the facets to the subsequent formed image.

Two outstanding problems exist which have not been solved by the prior art or by my previously referred to kaleidoscope. The first of these is to get a complete 360° kaleidoscopic image with reasonable focus and, also, with good light balance between the various formed segments. In view of the fact that the figure closest to the outer edge of the reflecting members 32, 50 is the one which is reflected and re-reflected more than any of the others and hence has the longest optical path to travel, compensation for this added length of optical path is accomplished both by making the outer edge of the surfaced mirrors in the form of an arc, and by tilting the mirror assembly with respect to the projection light or film. This outer edge is caused to be of approximately the same brilliance despite the light losses due to the added travel as is the inner edge or that section closest to the axis of the formed image.

Added compensation is obtained by angularly positioning the lens 37 with respect to the mirrors 32, 50. By angularly positioning is meant that the axis of the mirrors is neither coincident with or parallel to the axis of the lens which, in this case, is illustrated as being a plano-convex lens. It will be seen that this also draws the lens closer to the outer portion of the mirrors which have the longest optical path, and the lower part of the lens is farther away from the section of the mirrors along which is carried the shortest optical path material. Optimum adjustments, of course, can be made to meet particular circumstances.

It should be noted that the light from the lens 19 is focused about ¼ of the way down the aperture to vertically unbalance the lighting of the entire aperture.

Positioning of the objective screen is a further way of compensating for any qualities in light and focus of the finally formed image. By angularly positioning the various sections of the optical system with respect to each other, in effect the ratio of the distances from the material to the objective lens and the objective lens to the screen remains substantially constant.

It will be appreciated that there will be equivalents which will fall fairly within the spirit and scope of my invention, and which will be apparent to those skilled in the art to which this invention belongs. One such equivalent has been mentioned hereinbefore as the substitution of a prism having totally reflecting faces for the reflecting members, described in the particular embodiment according to Fig. 1. Accordingly, I am not limited to the particular showing of this invention, but consider myself to be fairly entitled to all equivalents which fall fairly within the spirit and scope of the invention as identified in the hereinafter appended claims.

What I claim is:

1. A projection kaleidoscope comprising a pair of opposed planar reflecting surfaces positioned at an angle to each other to form a V-shaped trough, a source of light positioned in a plane substantially bisecting the angle between the reflecting surfaces, the source of light being located to direct light into the trough formed by the reflecting surfaces at an acute angle with respect to the junction of the surfaces, an image bearing surface located between the source of light and the reflecting surfaces, the image bearing surface being positioned in a plane substantially normal to the path of light and adjacent one end of the reflecting surfaces, a projection lens located at the opposite end of the reflecting surfaces, said lens being positioned in a plane normal to the plane substantially bisecting the angle between the reflecting surfaces, and means for pivotally supporting said projection lens whereby the angle between a line through the optical axis of the lens and the junction of the reflecting surfaces may be variable.

2. A projection kaleidoscope comprising a pair of light reflecting surfaces, means for positioning the reflecting surfaces at an angle with respect to each other and with one edge of each surface in mutual contact, a source of light positioned in a plane substantially bisecting the angle between the reflecting surfaces and located to direct light onto each of the surfaces along a path forming an acute angle with respect to the edges that are in mutual contact, means for positioning an image bearing surface between the source of light and one end of the reflecting surfaces, a projection lens located at the opposite end of the reflecting surfaces, said lens being positioned in a plane normal to the plane substantially bisecting the angle between the reflecting surfaces, and means for pivotally supporting said projection lens on a line normal to the plane substantially bisecting the angle between the reflecting surfaces.

WILLIAM C. EDDY.